United States Patent
Kang et al.

(10) Patent No.: US 8,976,770 B2
(45) Date of Patent: Mar. 10, 2015

(54) METHOD AND DEVICE WHEREBY BASE STATION ALLOCATES NODES TO TERMINAL IN A SEMI-STATIC FASHION IN MULTI-NODE SYSTEM

(75) Inventors: Jiwon Kang, Anyang-si (KR); Jinyoung Chun, Anyang-si (KR); Sunam Kim, Anyang-si (KR); Binchul Ihm, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 13/812,394

(22) PCT Filed: Jul. 27, 2011

(86) PCT No.: PCT/KR2011/005532
§ 371 (c)(1),
(2), (4) Date: Jan. 25, 2013

(87) PCT Pub. No.: WO2012/015238
PCT Pub. Date: Feb. 2, 2012

(65) Prior Publication Data
US 2013/0128761 A1 May 23, 2013

Related U.S. Application Data

(60) Provisional application No. 61/368,230, filed on Jul. 27, 2010.

(51) Int. Cl.
*H04Q 7/24* (2006.01)
*H04W 72/04* (2009.01)
*H04W 88/08* (2009.01)

(52) U.S. Cl.
CPC ............ *H04W 72/04* (2013.01); *H04W 72/046* (2013.01); *H04W 88/085* (2013.01)
USPC ............ 370/338; 370/315; 370/401; 370/334

(58) Field of Classification Search
None
See application file for complete search history.

(56) References Cited

U.S. PATENT DOCUMENTS

| | | | | |
|---|---|---|---|---|
| 8,023,524 | B2 * | 9/2011 | Doppler et al. | 370/431 |
| 8,483,702 | B2 * | 7/2013 | Noriega et al. | 455/453 |
| 2006/0146755 | A1 * | 7/2006 | Pan et al. | 370/334 |
| 2008/0049709 | A1 | 2/2008 | Pan et al. | |

(Continued)

FOREIGN PATENT DOCUMENTS

| | | |
|---|---|---|
| JP | 2011-517385 A | 6/2011 |
| KR | 10-2010-0113176 A | 10/2010 |
| KR | 10-1066151 B1 | 9/2011 |

*Primary Examiner* — Duc C Ho
(74) *Attorney, Agent, or Firm* — Birch, Stewart, Kolasch & Birch, LLP

(57) ABSTRACT

The present invention relates to wireless communication, and more specifically, to a method and device whereby a base station allocates nodes to a terminal in a semi-static fashion in a multi-node system. The method, according to one aspect of the present invention, whereby a base station allocates at least a portion of a plurality of nodes to a terminal in a multi-node system comprising the plurality of nodes and the base station for controlling the plurality of nodes, comprises the steps of: receiving, from the terminal, data showing at least one first node that is preferred among the plurality of nodes by the terminal; and transmitting, to the terminal, first data for allocating the first node(s) to the terminal. The first data may comprise pilot data which is required by the terminal in order to transmit, to the base station, feedback data concerning the first node.

16 Claims, 12 Drawing Sheets

(56) References Cited

U.S. PATENT DOCUMENTS

| | | |
|---|---|---|
| 2009/0245169 A1 | 10/2009 | Zhang et al. |
| 2010/0056171 A1* | 3/2010 | Ramprashad et al. ..... 455/452.1 |
| 2010/0183086 A1 | 7/2010 | Ko et al. |
| 2010/0265874 A1 | 10/2010 | Palanki et al. |
| 2011/0013563 A1 | 1/2011 | Sivanesan et al. |
| 2011/0164697 A1* | 7/2011 | Liao et al. ..................... 375/260 |
| 2012/0053879 A1* | 3/2012 | Chang et al. .................. 702/104 |
| 2013/0044685 A1* | 2/2013 | Fong et al. .................... 370/328 |

\* cited by examiner

METHOD AND DEVICE WHEREBY BASE STATION ALLOCATES NODES TO TERMINAL IN A SEMI-STATIC FASHION IN MULTI-NODE SYSTEM

CROSS REFERENCE TO RELATED APPLICATIONS

This non-provisional application is a National Stage entry under U.S.C. §371 of International Application No. PCT/KR2011/005532 filed on Jul. 27, 2011, which claims the benefit of U.S. Provisional Application No. 61/368,230 filed on Jul. 27, 2010. The entire contents of all of the above applications are hereby incorporated by reference.

TECHNICAL FIELD

The present invention relates to wireless communication, and more particularly, to a method and device for allocating a node to a terminal in a semi-static fashion at a base station in a multi-node system.

BACKGROUND ART

Recently, since various devices requiring machine-to-machine (M2M) communication and high data transfer rate, such as smartphones or tablet personal computers (PCs), have appeared and come into widespread use, a data transfer rate of a wireless communication network has been rapidly increased. In order to satisfy the required high data transfer rate, recently, carrier aggregation (CA) technology which efficiently uses more frequency bands, cognitive ratio technology, multiple antenna technology for increasing data capacity in a restricted frequency, multiple base station cooperative transmission technology, etc. have been spotlighted.

In addition, a wireless communication network has evolved such that the density of accessible nodes is increased in the vicinity of a user. Here, the node refers to antennas or antenna groups spaced apart from each other by a predetermined distance or more in a distributed antenna system (DAS). However, the meaning of the node is not limited thereto and the node may have a wider meaning. That is, the node may include a picocell base station (PeNB), a home base station (HeNB), a remote radio head (RRH), a remote radio unit (RRU), a relay, distributed antennas (group), etc. A wireless communication system including nodes with high density may have higher system performance by cooperation between nodes. That is, unlike the case in which each node is an independent base station (BS), an advanced BS (ABS), a Node-B (NB), an eNode-B (eNB) or an access point (AP) which operates without cooperation, if one control station manages transmission and reception of each node such that each node operates as an antenna or antenna group for one cell, better system performance can be achieved. Hereinafter, a wireless communication system including a plurality of nodes is referred to as a multi-node system.

In a multi-node system, if each node performs scheduling and handover using an identifier (ID) thereof, the multi-node system may be regarded as a multi-cell system. In a multi-cell system, if the coverage areas of cells (that is, nodes) overlap, the multi-cell system is referred to as a multi-tier network.

DISCLOSURE

Technical Problem

An object of the present invention is to provide a method and device for allocating a node to a terminal in a semi-static fashion at a base station in a multi-node system.

The technical problems solved by the present invention are not limited to the above technical problems and other technical problems which are not described herein will become apparent to those skilled in the art from the following description.

Technical Solution

The object of the present invention can be achieved by providing a method of assigning at least some of a plurality of nodes to a terminal at a base station in a multi-node system including the plurality of nodes and the base station controlling the plurality of nodes, the method including receiving information indicating at least one first node preferred by the terminal among the plurality of nodes from the terminal, and transmitting first information for assigning the first node to the terminal to the terminal, wherein the first information includes pilot information necessary to transmit feedback information of the first node from the terminal to the base station.

The method may further include receiving the feedback information from the terminal, and the feedback information is for at least one node included in the first node.

The plurality of nodes may include a macro base station, a picocell base station (PeNB), a home base station (HeNB), a remote radio head (RRH), a relay, an antenna and a distributed antenna group, and each of the plurality of nodes may be connected to the base station by wire.

The first node may be determined by the terminal based on path loss measured from each of the plurality of nodes.

The feedback information may include at least one of a channel quality indicator (CQI) and a precoding matrix index (PMI).

The feedback information may include a per-node-PMI included in the first node.

The pilot information may include a reference signal (RS) for measuring the CQI or the PMI.

The method may further include receiving the feedback information from the terminal, and transmitting data to the terminal based on the received feedback information, the data may be transmitted through at least one node included in the first node, and at least one node, through which the data is transmitted, may be selected in consideration of a resource assignment state.

The method may further include transmitting, to the terminal, an indicator indicating the at least one node, through which the data is transmitted.

The method may further include transmitting, to the terminal, the total number of data streams transmitted to the terminal and index information of the data streams assigned to the terminal.

In another aspect of the present invention, there is provided a method of allowing a terminal to be assigned at least some of a plurality of nodes by a base station in a multi-node system including the plurality of nodes and the base station controlling the plurality of nodes, the method including: transmitting information indicating at least one first node preferred by the terminal among the plurality of nodes to the base station; receiving first information for assigning the first node from the base station; and transmitting feedback information for the first node to the base station, wherein the first information includes pilot information necessary to transmit the feedback information from the terminal to the base station, and wherein the feedback information is for at least one node included in the first node.

The plurality of nodes may include a macro base station, a picocell base station (PeNB), a home base station (HeNB), a remote radio head (RRH), a relay, an antenna and a distributed antenna group, and each of the plurality of nodes may be connected to the base station by wire.

The first node may be determined by the terminal based on path loss measured from each of the plurality of nodes.

The feedback information may include at least one of a channel quality indicator (CQI) and a precoding matrix index (PMI).

The feedback information may include a per-node-PMI included in the first node.

The pilot information may include a reference signal (RS) for measuring the CQI or the PMI.

In another aspect of the present invention, there is provided a base station for assigning at least some of a plurality of nodes to a terminal in a multi-node system including the plurality of nodes and the base station controlling the plurality of nodes, the base station including a reception module for receiving information indicating at least one first node preferred by the terminal among the plurality of nodes from the terminal; and a transmission module for transmitting, to the terminal, first information for assigning the first node to the terminal, wherein the first information includes pilot information necessary to transmit feedback information of the first node from the terminal to the base station.

The feedback information may be for at least one node included in the first node.

The base station may further include a processor for controlling reception of the feedback information from the terminal through the reception module and transmission of data to the terminal based on the received feedback information, the data may be transmitted through at least one node included in the first node, and at least one node, through which the data is transmitted, may be selected in consideration of a resource assignment state.

In another aspect of the present invention, there is provided a terminal assigned at least some of a plurality of nodes by a base station in a multi-node system including the plurality of nodes and the base station controlling the plurality of nodes, the terminal including: a transmission module for transmitting information indicating at least one first node preferred by the terminal among the plurality of nodes to the base station; a reception module for receiving first information for assigning the first node from the base station; and a processor for controlling transmission of feedback information for the first node to the base station, wherein the first information includes pilot information necessary to transmit the feedback information to the base station, and wherein the feedback information is for at least one node included in the first node.

Advantageous Effects

In a multi-node system, a base station can efficiently assign a node to a terminal according to the present invention.

The effects of the present invention are not limited to the above-described effects and other effects which are not described herein will become apparent to those skilled in the art from the following description.

BEST MODE

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. IEEE 802.16m is an evolved version of IEEE 802.16e.

Figure 1:
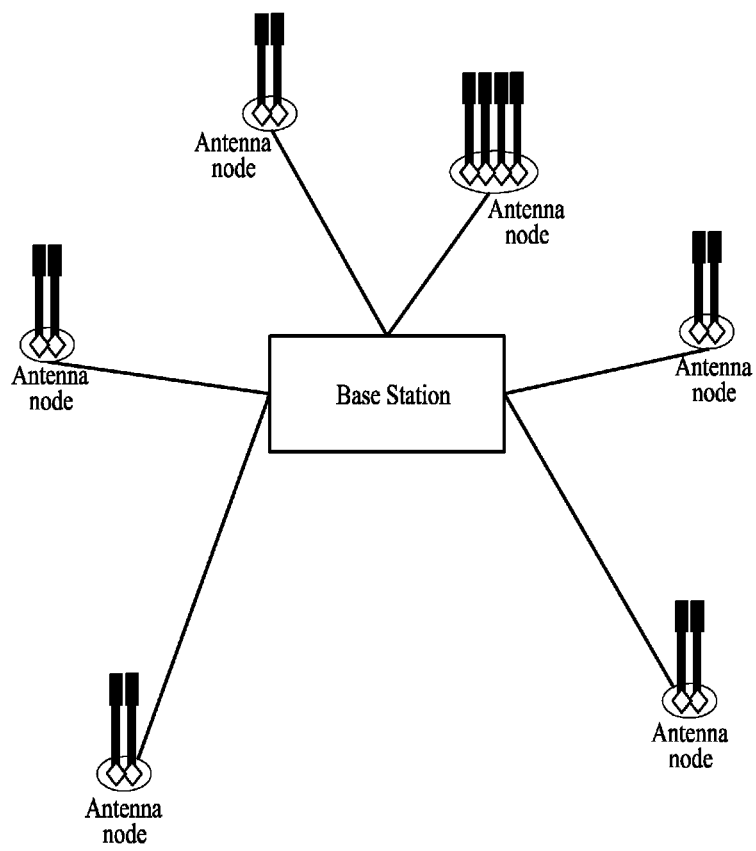
FIG. 1 is a diagram showing an example of a multi-node system.

FIG. 1 is a diagram showing an example of a multi-node system.

Referring to FIG. 1, the multi-node system includes a base station and a plurality of nodes.

In FIG. 1, a node represented by an antenna node may mean a macro base station a picocell base station (PeNB), a home base station (HeNB), a remote radio head (RRH), a relay, a distributed antenna (group), etc. Such a node is referred to as a point.

In the multi-node system, if one base station controller manages transmission and reception of all nodes such that an individual node operates as a part of one cell, the multi-node system may be regarded as a distributed antenna system (DAS) forming one cell. In the DAS, individual nodes may be assigned respective node IDs or operate as an antenna group of the cell without separate node IDs. In other words, the DAS refers to a system in which antennas (that is, nodes) are distributed at various positions in a geographical region and are managed by a base station. The DAS is different from a centralized antenna system (CAS) in which antennas of a base station are positioned at the center of a cell.

If an individual node has an individual cell ID and performs scheduling and handover in the multi-node system, the multi-node system may be regarded as a multi-cell (e.g., macrocell/femtocell/picocell) system. If the coverage areas of such multiple cells overlap, the multi-node system is referred to as a multi-tier network.

Figure 2:
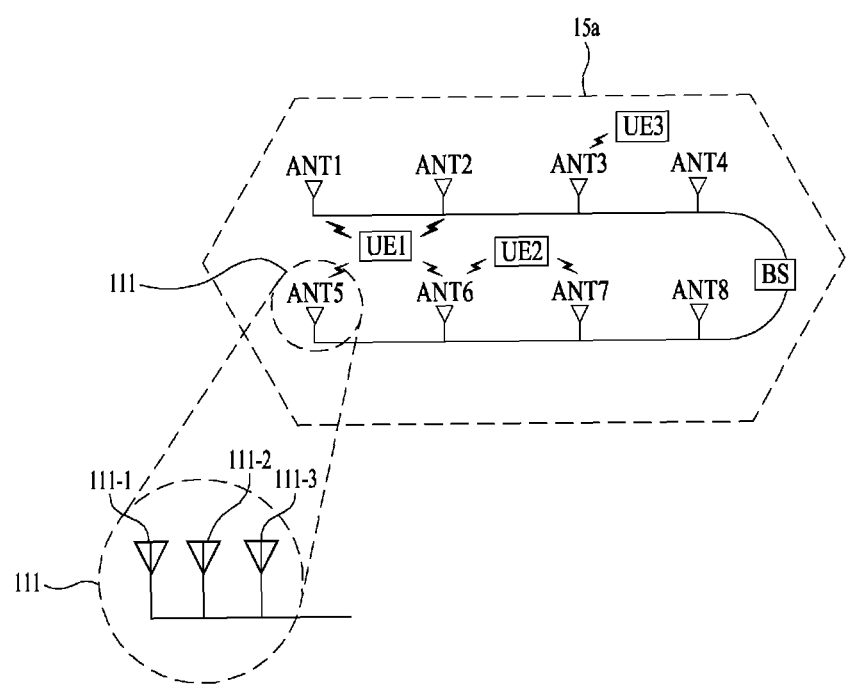
FIG. 2 is a diagram showing a distributed antenna system which is an example of a multi-node system.

FIG. 2 is a diagram showing a distributed antenna system (DAS) which is an example of a multi-node system.

Referring to FIG. 2, the DAS includes a base station (BS) and a plurality of BS antennas (e.g., ant1 to ant8; hereinafter, the BS antenna is referred to as an antenna). The antennas ant1 to ant 8 may be connected to the BS by wire. In the DAS, antennas are not centralized at a specific point of a cell 15a, for example, at the center of the cell, but are distributed at various positions in the cell, unlike the conventional CAS. As shown in FIG. 2, one antenna may be separately present at each place in the cell (antennas 1 to 4 and 6 to 8) and several antennas 111-1, 111-2 and 111-3 may be concentrated at one place (an antenna 5 (111)). The concentrated antennas may configure one antenna node.

Coverage areas of the antennas are overlapped to enable transmission of rank 2 or more. For example, the coverage area of each antenna may influence an adjacent antenna. In this case, the strengths of signals received by terminals present in the cell from a plurality of antennas may be variously changed according to the positions of the terminals within the cell or the channel states. Referring to the example of FIG. 2, a terminal 1 (UE 1) may receive signals having good reception sensitivity from antennas 1, 2, 5 and 6. In contrast, signals transmitted from antennas 3, 4, 7 and 8 may barely influence the terminal 1 due to path loss.

A terminal 2 (UE 2) may receive signals having good reception sensitivity from antennas 6 and 7 and signals transmitted from the remaining antennas may barely influence the terminal 2. Similarly, a terminal 3 (UE 3) may receive signals having good reception sensitivity from an antenna 3 and the strengths of the signals from the remaining antennas may be negligible.

In the DAS, multiple input multiple output (MIMO) communication may be easily performed with respect to terminals separated from each other within the cell. In the above example, communication may be performed through antennas 1, 2, 5 and 6 with respect to a terminal 1, communication may be performed through an antenna 7 with respect to a terminal 2, and communication may be performed through an antenna 3 with respect to a terminal 3. Antennas 4 and 8 may transmit signals for terminal 2 or 3 or may not transmit a signal. That is, the antennas 4 and 8 may be turned off according to circumstances.

As described above, if MIMO communication is performed in the DAS, the number of layers (that is, the number of transmission streams) per terminal may vary. In addition, antennas (antenna groups) assigned to terminals may be different. In other words, in the DAS, a specific antenna (or a specific antenna group) in a system may be supported with respect to each terminal. The antenna supported with respect to the terminal may be changed with time.

Hereinafter, a process of exchanging information in order to transmit and receive data between a base station and a terminal in a multi-node system will be described.

In the multi-node system, a step of exchanging information between the terminal and the base station may be roughly divided into four steps: a cell entry step, a step of preparing for node assignment of the base station, a node assignment step and a data transmission and reception step. Hereinafter, this will be described in detail with reference to FIG. 3.

Figure 3:
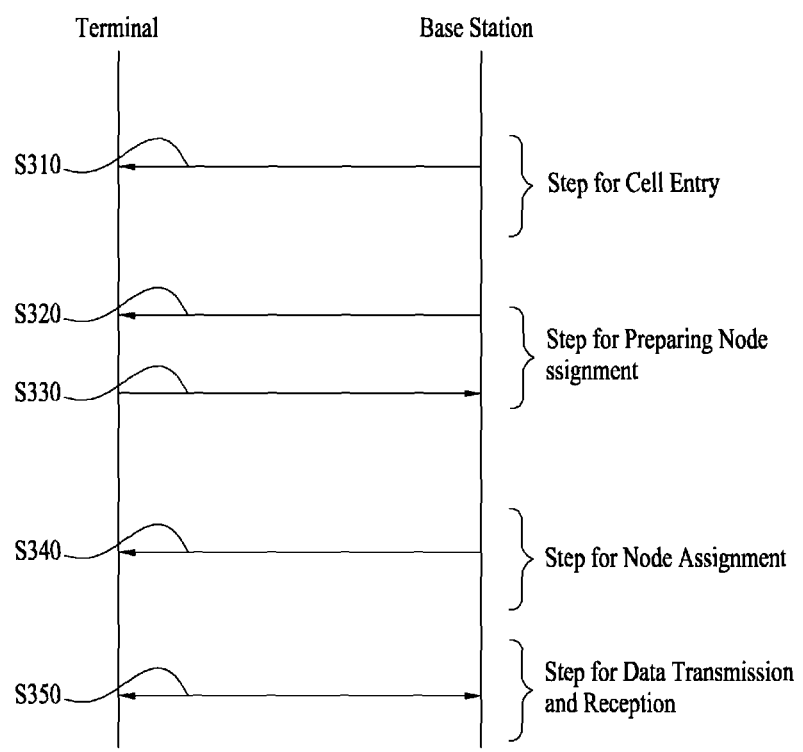
FIG. 3 is a diagram showing an example of an information exchange step required to transmit and receive data between a base station and a terminal in a multi-node system.

FIG. 3 is a diagram showing an example of an information exchange step required to transmit and receive data between a base station and a terminal in a multi-node system.

First, a cell entry step S310 is performed between the base station and the terminal.

If the terminal enters the multi-node system (e.g., initial network entry, network reentry, scanning, handover, etc.), the base station informs the terminal of configuration information of the multi-node system. This is referred to as the cell entry step.

That is, the terminal performs the cell entry step S310 such as synchronization with the base station when the terminal is powered on or enters a new cell.

The terminal may receive a synchronization channel (SCH) from the base station, perform synchronization with the base station, and acquire information such as a cell ID. Thereafter, the terminal may acquire intra-cell broadcast information from the base station.

In addition, the UE may receive a Downlink Reference Signal (DL RS) so as to confirm a downlink channel state in the initial cell entry step S310.

At this time, the configuration information of the multi-node system acquired from the base station by the terminal may include at least one of the total number of nodes within the multi-node system, the total number of antennas, the number of antennas of each node, etc.

The terminal which has performed the cell entry step may perform the step of preparing for node assignment from the base station.

In this step, the base station acquires information necessary to assign a node to the terminal from the terminal. For example, the base station may acquire the strength of an uplink signal, an uplink sounding signal, feedback information, etc. from the terminal.

The step of preparing for node assignment includes step S320 of, at the base station, requesting the terminal to transmit necessary information in order to acquire the necessary information and step S330 of the terminal transmitting the requested information to the base station.

In step S320, the base station may transmit, to the terminal, information such as an uplink sounding signal request, a feedback request, a request for the type of information to be fed back by the terminal, a request for the number of antenna nodes to be included in feedback information of the terminal.

At this time, the uplink sounding signal request is necessary to perform node assignment based on the uplink sounding signal.

In addition, if node assignment is performed based on a difference between uplink and downlink channels and feedback information of the terminal, the base station may request feedback and information about feedback from the terminal.

The information transmitted by the base station may be broadcast to terminals or transmitted to a terminal or a terminal group in unicast if the base station receives different types of feedback information per terminal.

Step S320 and step S310 may be simultaneously performed. That is, when a parameter of the multi-node system is transmitted to the terminal in step S310, the uplink signal transmission request signal may also be broadcast.

In addition, the feedback request may be omitted if the standard defines that feedback for node assignment is performed after the terminal acquires the parameter of the multi-node system.

In addition to the above information, the existing signaling information for a general communication operation may be transmitted to the terminal. For example, transmit power control information of each terminal may be transmitted when the uplink sounding signal is transmitted in addition to the uplink sounding request.

Next, step S330 of at the terminal, transmitting the requested information to the base station will be described.

Uplink signal transmission is performed when the base station requests uplink signal transmission or at a predetermined time.

The uplink signal is necessary to, at the base station, assign nodes to the terminals and may include an uplink sounding signal, a reference signal, various feedback signals, etc.

At this time, the terminal may transmit information indicating a plurality of preferred nodes to the base station. That is, the terminal may receive a specific signal transmitted by the base station per node, select a plurality of preferred nodes based on path loss measured with respect to each node and transmit information indicating the plurality of preferred nodes to the base station.

In addition, the terminal may measure the strength of a downlink signal of each node using the signal received from each node and transmit a feedback signal to the base station.

The various feedback signals may include at least one of reception strength of each node in uplink, reception strength of a downlink transmission node selected by the terminal among all nodes in downlink, the number of downlink transmission antenna nodes requested by the terminal, the number of downlink transmission nodes satisfying a predetermined condition, an identifier (e.g., an index) of a transmission antenna node preferred by the terminal among all downlink transmission antenna nodes and an identifier of a transmission antenna node satisfying a predetermined condition among all downlink transmission antenna nodes. At this time, the identifier of the node may be transmitted in the form of a bitmap.

The predetermined condition may indicate that the downlink signal reception strength of the node exceeds a threshold, for example.

If the base station specifies the number of antenna nodes to be fed back to the terminal, the terminal may feed indices and reception strength of antenna nodes having maximum reception strength and indices and reception strength of antenna nodes having minimum reception strength back to the base station according to the number of nodes.

Thereafter, the base station performs node assignment step S340.

In node assignment step S340, the base station acquires the feedback information, the uplink sounding signal, etc. through the uplink signal and transmits the assigned node information to each terminal. That is, the base station informs the terminal of base station antenna node information to be used in uplink or downlink per terminal or terminal group.

The antenna node assignment information may include information about base station antennas or antenna nodes which will be used by the terminal in downlink or uplink, the number of antennas included in each antenna node to be used and a pilot pattern of each antenna.

At this time, different nodes may be used by the terminal in downlink and uplink.

If antenna node assignment has been completed, the terminals may receive data from the specified antenna nodes and transmit data to the base station through the specified antenna nodes (S350). Step S350 of transmitting and receiving the data may be performed using a general method through the specified antenna node.

From the viewpoint of the terminal, cell entry step S310 may be performed only upon initial cell entry and the remaining steps S320, S330, S340 and S350 may be repeatedly performed.

That is, initially, steps from cell entry step S310 to data transmission and reception step S350 may be sequentially performed. However, after or during data transmission and reception step S350, steps S320 and S330 for preparing node assignment may be performed.

For example, feedback information such as CQI or PMI transmitted upon data exchange and a variety of feedback information for antenna assignment in steps S320 and S330 of preparing for node assignment may be simultaneously transmitted. Alternatively, the base station may transmit the feedback or uplink sounding signal request to the terminal to collect information about node assignment upon downlink control information transmission in the data exchange process.

Node assignment step S340 is not necessarily performed after steps S320 and S330 of preparing for node assignment. That is, even when the base station acquires information through the feedback and uplink sounding signal, etc., node assignment step S340 may be more intermittently performed according to the speed and position change of the terminal.

When the base station changes antenna node assignment information (node assignment step S340), since the terminal recognizes the changed antenna node information and then exchanges data, node assignment step S340 is performed independently of data transmission and reception step S350.

If steps S320 and S330 of preparing for node assignment is performed simultaneously with data transmission and reception step S350, the steps may be performed in the following order. Here, parentheses mean that, while a step is performed, another step may be performed.

First step→second step→third step→fourth step (second step)→third step→fourth step (second step)→third step→fourth step (second step)→third step→fourth step (second step)→ . . . .

Next, the structure of the radio frame to which the present invention is applicable will be described.

Although the structure of the radio frame applied in 3GPP LTE is described for convenience of description, the present invention is not limited thereto and various structures of the radio frame are possible.

Figure 4:
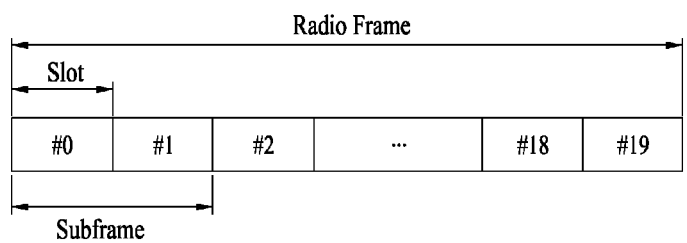
FIG. 4 is a diagram showing the structure of a frequency division duplex (FDD) radio frame in $3^{rd}$ generation partnership project (3GPP) long term evolution (LTE)

FIG. 4 is a diagram showing the structure of a frequency division duplex (FDD) radio frame in $3^{rd}$ generation partnership project (3GPP) long term evolution (LTE). Such a radio frame is referred to as frame structure type 1.

Referring to FIG. 4, the radio frame includes ten subframes and one subframe includes two continuous slots. A time required for transmitting one subframe is defined as a transmission time interval (TTI). The duration of the radio frame is $T_f=307200*T_s=10$ ms and includes 20 slots. The duration of each slot is $T_{slot}=15360*T_s=0.5$ ms and the 20 slots are numbered 0 to 19. Downlink, in which each node or base station transmits a signal to the terminal, and uplink, in which the terminal transmits a signal to each node or base station, are distinguished in a frequency domain.

Figure 5:
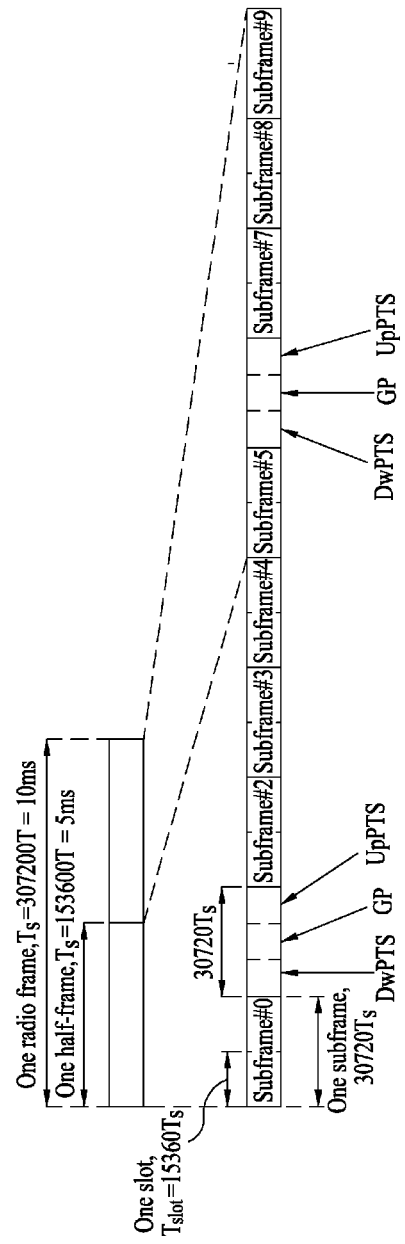
FIG. 5 is a diagram showing the structure of a time division duplex (TDD) radio frame in 3GPP LTE.

FIG. 5 is a diagram showing the structure of a time division duplex (TDD) radio frame in 3GPP LTE. Such a radio frame structure is referred to as frame structure type 2.

Referring to FIG. 5, one radio frame has a length of 10 ms and includes two half-frames each having a length of 5 ms. In addition, one half-frame includes five subframes each having a length of 1 ms. One subframe is set to any one of an uplink (UL) subframe, a downlink (DL) subframe and a special subframe. One radio frame includes at least one uplink subframe and at least downlink subframe. One subframe is defined as two continuous slots. For example, the length of one subframe may be 1 ms and the length of one slot may be 0.5 ms.

The special subframe is a specific period for dividing uplink and downlink between an uplink subframe and a downlink subframe. One radio frame includes at least one special subframe and the special subframe includes a downlink pilot time slot (DwPTS), a guard period, and an uplink pilot time slot (UpPTS). DwPTS is used to perform initial cell search, synchronization or channel estimation. The UpPTS is used to perform channel estimation in a base station and uplink transmission synchronization of a terminal. The guard period is used to eliminate interference occurring in uplink due to multi-path delay of a downlink signal between uplink and downlink.

In the FDD and TDD radio frames, one slot includes a plurality of orthogonal frequency division multiplexing (OFDM) symbols in a time domain and includes a plurality of resource blocks (RBs) in a frequency domain. An OFDM symbol represents one symbol period because 3GPP LTE uses OFDMA in downlink and may be called SC-FDMA symbol. The resource block is a resource assignment unit and includes a plurality of continuous subcarriers per slot.

For the structure of the radio frame described with reference to FIGS. 4 and 5, refer to Chapters 4.1 and 4.2 of 3GPP TS 36.211 V8.3.0 (2008-05) "Technical Specification Group Radio Access network; Evolved Universal Terrestrial Radio Access (E-UTRA); Physical Channels and Modulation (Release 8)".

The above-described structure of the radio frame is only exemplary and the number of subframes included in the radio frame, the number of slots included in the subframe and the number of OFDM symbols included in the slot may be changed in various ways.

Figure 6:
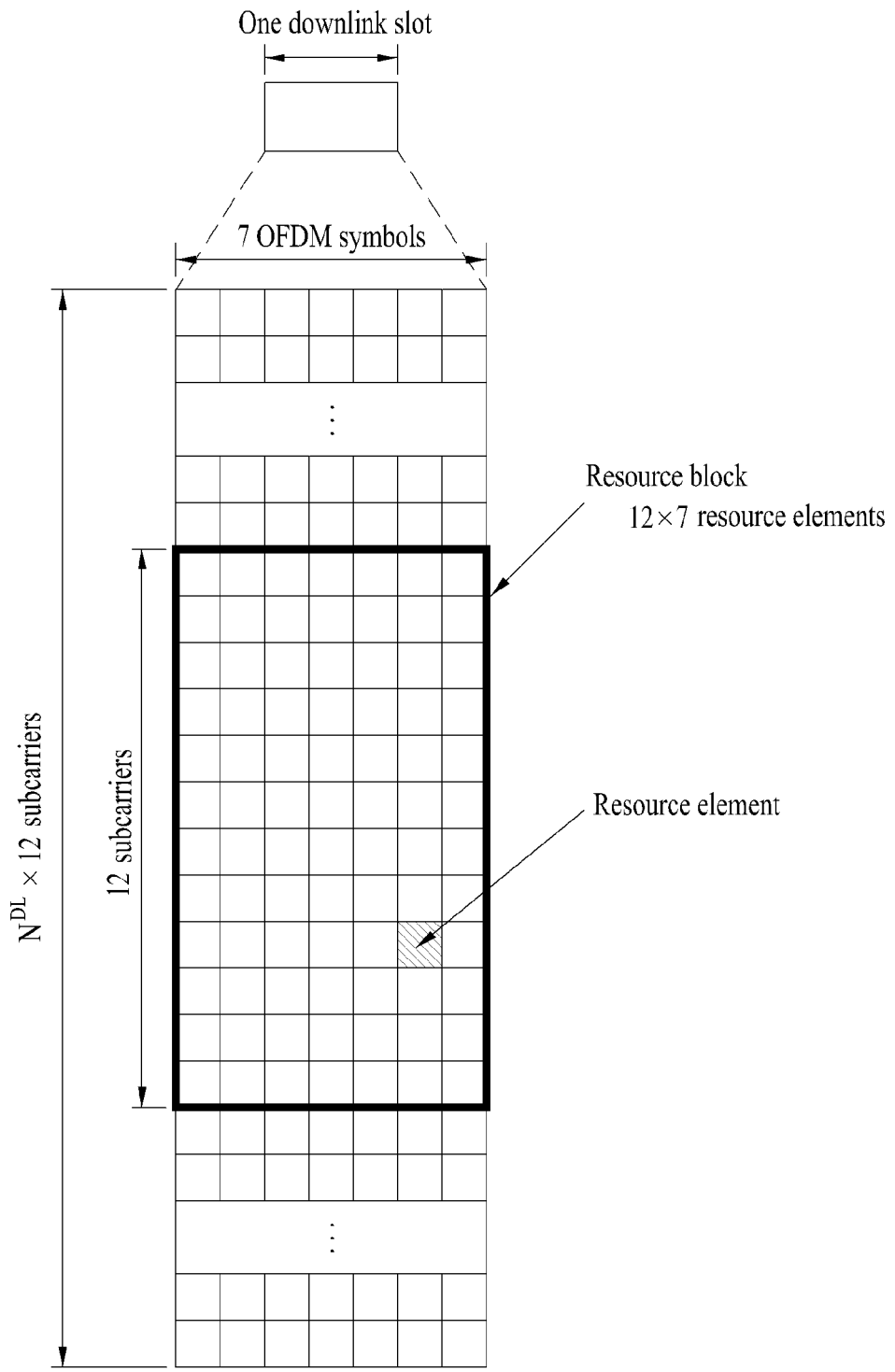
FIG. 6 is a diagram showing an example of resource grid of one downlink slot.

FIG. 6 is a diagram showing an example of resource grid of one downlink slot.

Referring to FIG. 6, one downlink slot includes a plurality of OFDM symbols in a time domain. Although one downlink slot includes 7 OFDMA symbols and one RB includes 12 subcarriers in the frequency domain in the above-described example, the present invention is not limited thereto.

Each element on the resource grid is referred to as a resource element and one RB includes 12×7 resource elements. The number $N^{DL}$ of RBs included in a downlink slot depends on downlink transmission bandwidth. The resource grid of the downlink slot is applicable to an uplink slot.

Figure 7:
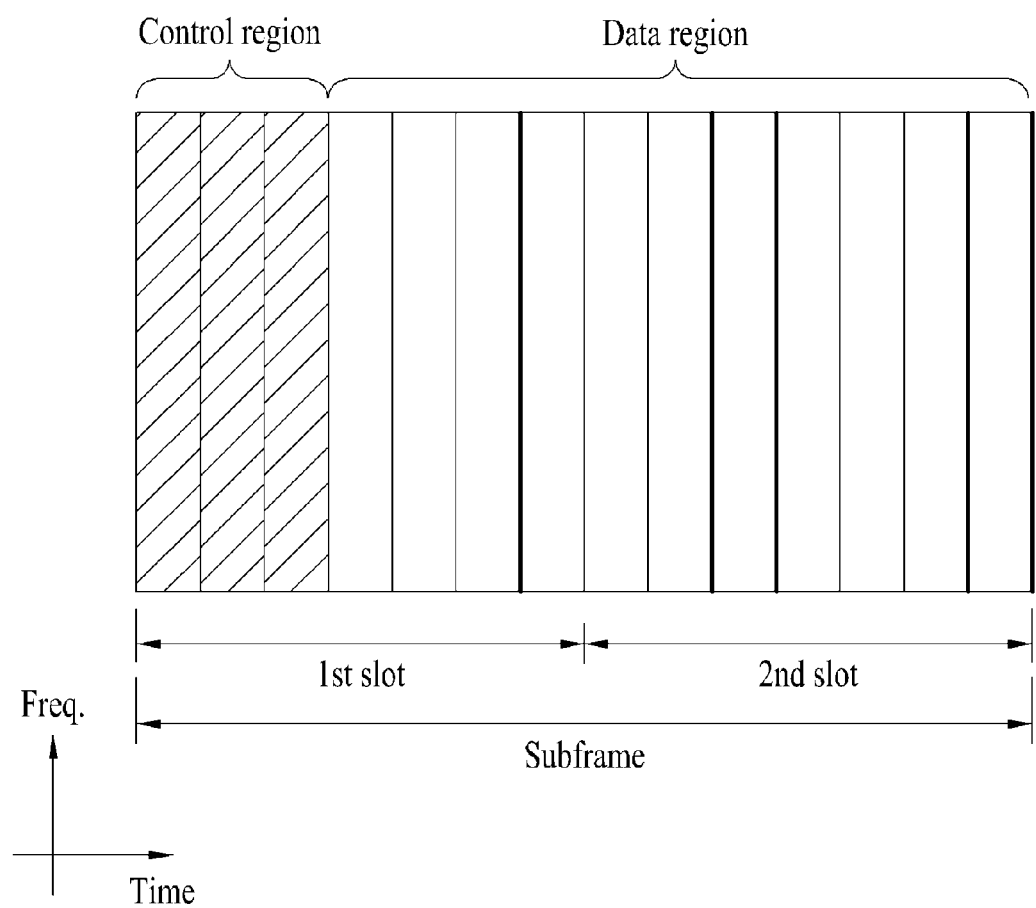
FIG. 7 is a diagram showing an example of a downlink subframe structure.

FIG. 7 is a diagram showing an example of a downlink subframe structure.

Referring to FIG. 7, a subframe includes two continuous slots. At most first three OFDM symbols of a first slot in a subframe correspond to a control region to which downlink control channels are assigned and the remaining OFDM symbols correspond to a data region to which physical downlink shared channels (PDSCHs) are assigned.

A downlink control channel includes a physical control format indicator channel (PCFICH), a physical downlink control channel (PDCCH), a physical hybrid-ARQ indicator channel (PHICH), etc. A PCFICH transmitted at a first OFDM symbol of a subframe carries information about the number of OFDM symbols (that is, the size of the control region) used to transmit control channels within a subframe. Control information transmitted through a PDCCH is referred to as downlink control information (DCI). The DCI indicates uplink resource assignment information, downlink resource assignment information and uplink transmit power control command of arbitrary UE groups. The PHICH carries an acknowledgement (ACK)/negative-acknowledgement (NACK) signal of a hybrid automatic repeat request (HARQ) of uplink data. That is, the ACK/NACK signal of the uplink data transmitted by the terminal is transmitted via the PHICH.

The PDSCH is a channel for transmitting control information and/or data. The terminal may decode downlink control information transmitted via a PDCCH and read data transmitted through a PDSCH.

Figure 8:
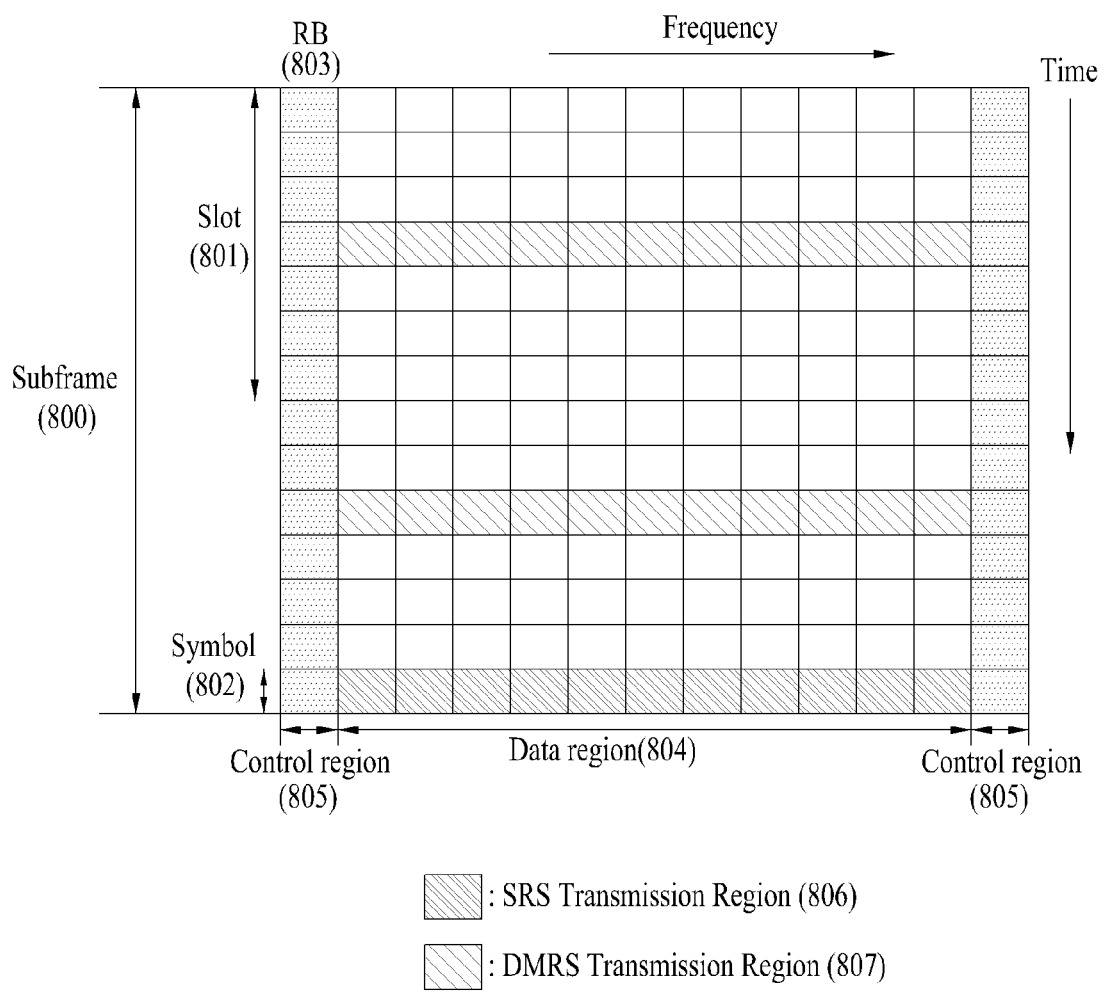
FIG. 8 is a diagram showing the structure of an uplink subframe used in an LTE system.

FIG. 8 is a diagram showing the structure of an uplink subframe used in an LTE system.

Referring to FIG. 8, a subframe 800 having a length of 1 ms which is a basic unit of LTE uplink transmission includes two slots 801 having a length of 0.5 ms. In the case of a length of a normal Cyclic Prefix (CP), each slot includes 7 symbols 802 and one symbol corresponds to one Single carrier-Frequency Division Multiple Access (SC-FDMA) symbol. An RB 803 is a resource allocation unit corresponding to 12 subcarriers in a frequency domain and one slot in a time domain. The structure of the uplink subframe of the LTE system is roughly divided into a data region 804 and a control region 805. The data region refers to a series of communication resources used for transmission of data, such as voice or packet data transmitted to each terminal, and corresponds to remaining resources excluding the control region within a subframe. The control region refers to a series of communication resources used to transmit a downlink channel quality report from each terminal, reception ACK/NACK of a downlink signal, uplink scheduling requests or the like.

As shown in FIG. 8, a region 806 in which sounding reference signals may be transmitted within one subframe is a region in which SC-FDMA symbols located at the end of a time axis are present in one subframe, and the sounding reference signals are transmitted through a data transmission region on a frequency axis. Sounding reference signals of several terminals transmitted through the last SC-FDMA of the same subframe may be distinguished according to a cyclic shift value. In addition, in one subframe, a region in which demodulation (DM)-reference signals (RSs) are transmitted is a region in which middle SC-FDMA symbols, that is, a fourth SC-FDMA symbol and an eleventh SC-FDMA symbol, are present in one slot and the DM-RSs are transmitted through a data transmission region on a frequency axis.

Figure 9:
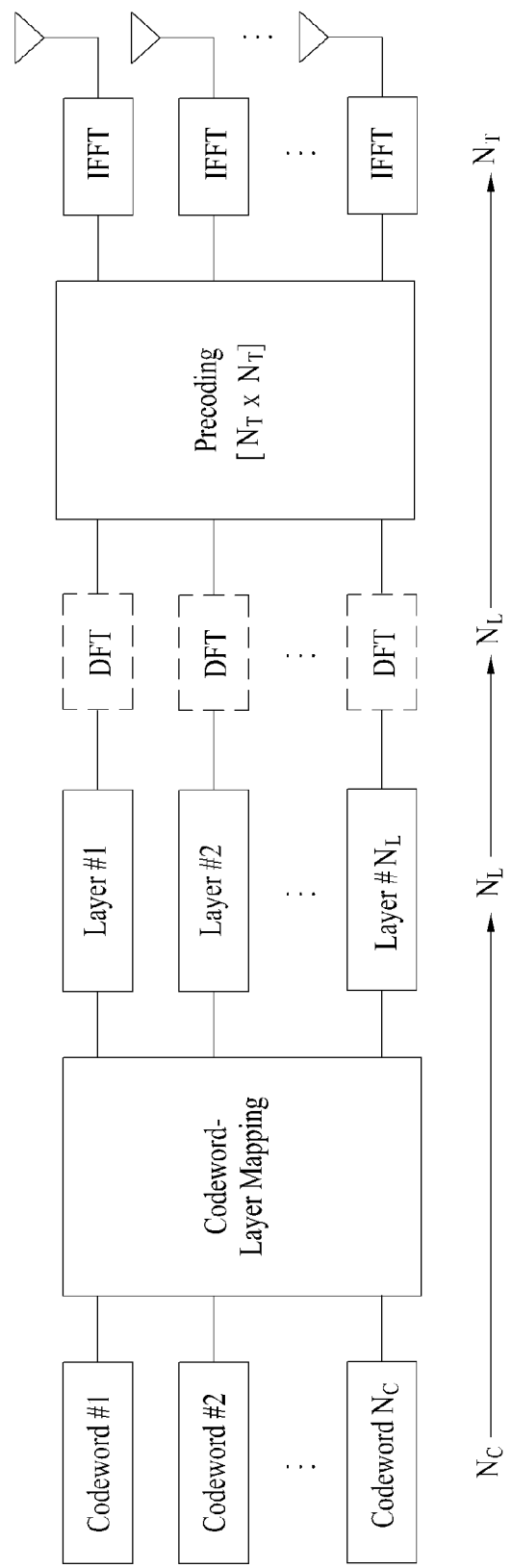
FIG. 9 is a diagram illustrating a mapping relationship among a codeword, a layer and an antenna for transmitting a downlink signal in a multi-antenna wireless communication system.

FIG. 9 is a diagram illustrating a mapping relationship among a codeword, a layer and an antenna for transmitting a downlink signal in a multi-antenna wireless communication system.

As shown in FIG. 9, a complicated mapping relationship is present between data and a transport symbol. First, a medium access control (MAC) layer is a physical layer for forwarding $N_C$ transport blocks as data. In the physical layer, transport blocks are converted into codewords through a channel coding process and are subjected to rate matching such as puncturing or repetition. Here, channel coding is performed in a channel coder such as a turbo encoder or a tail bit convolutional encoder.

After the channel coding process and the rate matching process, the $N_C$ transport blocks are mapped to $N_L$ layers. Here, the layer refers to different information forwarded using multi-antenna technology and the number of layers may not be greater than rank which is a maximum number of pieces of different information which may be transmitted. This may be expressed by #of Layers≤rank(H)≤min($N_T$, $N_R$). H denotes a channel matrix.

For reference, unlike an orthogonal frequency division multiple access (OFDMA) transmission which is a general downlink transmission scheme, in an uplink signal transmitted using a single carrier-frequency division multiple access (SC-FDMA) scheme, a DFT process is performed in each layer in order to cancel an effect generated by inverse fast Fourier transform (IFFT) such that a transmitted signal has a single carrier property.

A DFT converted signal in each layer is multiplied by a precoding matrix to be mapped to $N_T$ transmit antennas, is subjected to an IFFT process, and is transmitted to the base station.

In general, a common reference signal and a UE specific reference signal are present in a downlink reference signal and the common reference signal is not precoded. That is, the UE specific reference signal is inserted in a previous stage of a precoding stage, is precoded and is transmitted to the terminal, similarly to general data.

In order to implement channel non-dependent spatial multiplexing transmission using the UE specific reference signal, that is, a dedicated reference signal, there are several constraint conditions. First, in order to reduce signaling overhead of a reference signal, a transmission reference signal must be precoded using the same precoding matrix as the modulated data symbol. In addition, in order to acquire spatial channel diversity, a precoding matrix must be switched between antennas. However, as the dedicated reference signal is transmitted over the overall transmission resource region according to a specific rule or arbitrarily, it is difficult to satisfy the constraint conditions. Since channel measurement is performed in units of a specific number of resource elements for channel measurement efficiency, a precoding matrix for precoding a dedicated reference signal may not be changed in resource element units.

In order to report a channel quality indicator (CQI) to the base station, the terminal measures a channel and generates the CQI as information on the assumption that the base station transmits the reference signal in a transmission mode shown in Table 1. That is, Table 1 shows the PDSCH transmission mode of the base station, which is assumed for measurement of the CQI by the terminal.

TABLE 1

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |

For example, in Table 1, transmission mode 7 indicates a beamforming transmission mode and supports a single data stream, that is, transmission of rank 1. If a plurality of PBCH antenna ports is present, the PDSCH transmission mode of the base station is assumed to transmit diversity for CQI measurement. In addition, the CQI is fed back to the base station in the form of an index as shown in Table 2 and the base station determines a transmission format such as a modulation scheme and coding rate corresponding to the fed-back CQI according to CQI index and performs downlink transmission to the terminal.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In general, the multi-antenna system may support transmission of multiple data streams for data transfer rate improvement.

Step of preparing for node assignment and step of assigning the node will be described with reference to steps S320 to S340 of FIG. 3.

As described above, the terminal receives a specific signal transmitted by the base station per antenna node, selects a preferred antenna node based on path loss measured with respect to each node, and reports the preferred antenna node to the base station, thereby being assigned an antenna node by the base station.

That is, the terminal selects the preferred antenna node by a reference signal (RS) transmitted by the base station per antenna node and reports the preferred antenna node selected for a long period (e.g., a plurality of frames) to the base station.

Hereinafter, the RS applicable to the present invention will be described in detail.

For reduction of an interference signal, estimation of a channel state between a base station and a terminal and demodulation of a signal transmitted between a base station and a terminal, various RSs are transmitted between the base station and the terminal. The RS means a signal having a predefined special waveform known to the base station and the terminal, which is transmitted from the base station to the terminal or from the terminal to the base station. The RS is referred to as a pilot signal.

The reference signal may be roughly divided into a dedicated reference signal (DRS) and a common reference signal (CRS). The reference signal may be roughly divided into a demodulation reference signal and a channel measurement reference signal. The CRS and the DRS are also referred to as a cell-specific RS and a demodulation RS (DMRS), respectively. The DMRS is referred to as a UE-specific RS.

The CRS is used for both modulation and measurement and is commonly used by all terminals within a cell. In contrast, the DRS is generally used for demodulation and may be used by a specific terminal.

In case of CRS-based downlink transmission, the base station transmits a layer to the terminal and, at the same time, transmits a DRS for demodulating the layer and a CRS for channel estimation between the terminal and the base station. A CRS sequence is transmitted at all antenna ports regardless of the number of layers. In addition, since the CRS is used for both demodulation and measurement, the CRS is transmitted at all subframes supporting downlink transmission. Accordingly, in CRS-based downlink transmission, overall RS overhead is increased as the number of physical antenna ports is increased and thus data transmission efficiency is deteriorated.

In order to solve such a problem, instead of the CRS which is used for both demodulation and measurement such that transmission overhead is increased according to the number of antenna ports, a method of distinguishably using a demodulation RS and a channel measurement RS is proposed.

The terminal may measure the channel state/quality of the cell using the channel measurement RS and demodulate downlink data transmitted to the terminal using the demodulation RS.

Hereinafter, a method of configuring a channel measurement RS so as to measure a channel state of each cell and interference between each cell and a neighboring cell thereof while minimizing influence of interference between cells, and a method of measuring the channel state and/or interference are proposed. Hereinafter, the channel measurement RS is referred to as a channel state information reference signal (CSI-RS) in the embodiments of the present invention.

The channel state does not change greatly with time. In addition, since resources used to transmit the RS may not be used for data transmission, data throughput is reduced as RS overhead is increased. In consideration of this fact, unlike the CRS configured to be transmitted per frame, the CSI-RS is configured to be transmitted with a predetermined transmission period including a plurality of subframes. In this case, CSI-RS transmission overhead may be reduced as compared to CRS transmission overhead. Accordingly, in the present invention, the base station transmits CSI-RS(s) to the terminal located in a cell, to which the base station provides a communication service, with a transmission period including a plurality of subframes, not per subframe.

The base station performs CSI-RS transmission through a predetermined antenna group with the CSI-RS transmission period, for measurement of a channel established by the predetermined antenna group including one or more antennas belonging to the base station. The terminal which receives a communication signal from the predetermined antenna group may receive a CSI-RS transmitted by each antenna port in the predetermined antenna group and estimate/measure the state/quality of the channel established between the predetermined antenna group and the terminal. The terminal may feed the channel state information indicating the channel measurement result back to the base station.

Hereinafter, CSI-RS resources or CSI-RS REs may be used to transmit a CSI-RS. In addition, a symbol/carrier/subcarrier to which a CSI-RS is assigned is referred to as a CSI-RS symbol/carrier/subcarrier. For example, a symbol to which a CSI-RS is assigned is referred to as a CSI-RS symbol and a subcarrier to which a CSI-RS is assigned is referred to as a CSI-RS subcarrier. A subframe configured to transmit a CSI-RS is referred to as a CSI-RS subframe.

In addition, among antenna port(s) of the base station, an antenna port for transmitting a CSI-RS is referred to as a CSI-RS antenna port. The base station including $N_T$ antenna ports may configure a maximum of $N_T$ CSI-RS ports for CSI-RS transmission. If all the antennas of the base station transmit the CSI-RS, all the antenna ports are CSI-RS antenna ports and, if some of the antennas of the base station transmit the CSI-RS/DRS, some antenna ports are CSI-RS antenna ports. Each CSI-RS port transmits the CSI-RS through predetermined time-frequency resources.

The base station may transmit one or more CSI-RSs through one or more antenna ports in a cell-specific manner and the terminal may receive the CSI-RS(s) and measure the channel of the cell. The terminal may feed the channel state information indicating the channel measurement result back to the base station.

In order to prevent collision of CSI-RS transmission between multiple neighboring cells and prevent the CSI-RS to be transmitted by each cell from being dropped due to resource muting, the CSI-RS locations of the neighboring cells must not overlap. Accordingly, resources to which the CSI-RSs of the neighboring cells are assigned are preferably orthogonal. Orthogonality of the CSI-RSs may be obtained by mapping radio resources such that the CSI-RSs transmitted by the neighboring cells do not overlap in a predetermined time/frequency resource region. Hereinafter, a set of resources or the locations of the resources within a predetermined resource region (e.g., a resource block pair) in which the CSI-RS port(s) configured by the base station transmit the CSI-RS(s) is referred to as a CSI-RS pattern. For reference, the CSI-RS pattern is referred to as a CSI-RS configuration.

Figure 10:
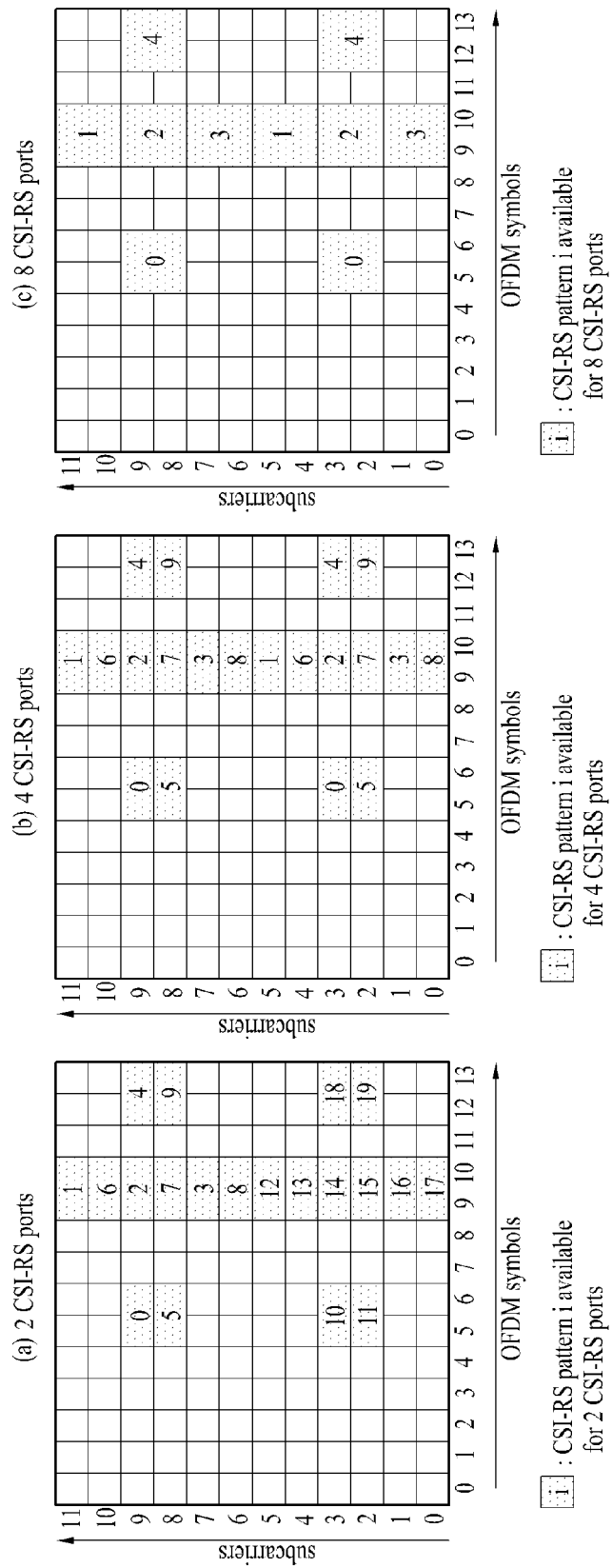
FIG. 10 is a diagram showing an example of a CSI-RS pattern.

FIG. 10 shows a CSI-RS pattern. For convenience of description, assume that the base station includes a maximum of eight CSI-RS ports. In addition, although it is assumed that the CSI-RS pattern is defined in a resource region including 12 subcarriers and 14 OFDM symbols in FIG. 10, the number of subcarriers and OFDM symbols configuring the resource region in which the CSI-RS pattern is defined may vary according to mobile communication system.

Referring to FIG. 10, FIG. 10(a) shows 20 CSI-RS patterns available for CSI-RS transmission using 2 CSI-RS ports, FIG. 10(b) shows 10 CSI-RS patterns available for 4 CSI-RS ports, and FIG. 10(c) shows 5 CSI-RS patterns available for 8 CSI-RS ports. The CSI-RS patterns defined according to the number of CSI-RS ports may be numbered.

If the base station configures two antenna ports, that is, two CSI-RS ports, for channel measurement RS transmission, the two CSI-RS ports perform CSI-RS transmission over radio resources belonging to one of the 20 CSI-RS patterns shown in FIG. 10(a). If the number of CSI-RS ports configured for a specific cell is 4, the four CSI-RS ports transmit CSI-RSs over a CSI-RS pattern configured for the specific cell among the 10 CSI-RS patterns shown in FIG. 10(b). Similarly, if the number of CSI-RS ports configured for the specific cell is 8, the eight CSI-RS ports transmit CSI-RSs over a CSI-RS pattern configured for the specific cell among the 5 CSI-RS patterns shown in FIG. 10(c).

In the multi-cell system, base station(s) of neighboring cells which participate in channel measurement and/or channel interference measurement configure different CSI-RS patterns for the neighboring cells so as to prevent collision of CSI-RS transmission. Hereinafter, a set of cells which participate in channel measurement and/or interference measurement is referred to as an estimation set. CSI-RS patterns in which time-frequency resources do not overlap are preferably assigned to cells of a predetermined estimation set.

The terminal must know over which resources the CSI-RS is transmitted in order to receive the CSI-RS from the base station and perform channel measurement using the CSI-RS. That is, the terminal must know the CSI-RS pattern of a serving cell in order to detect the CSI-RS transmitted by the base station of the serving cell over the CSI-RS pattern. Accordingly, the base station transmits CSI-RS configuration information for specifying the CSI-RS pattern to terminals within the coverage of the base station.

The signal transmitted by the base station per antenna node may be different from an RS supported by LTE Rel.10 and thus is referred to as a DAS-RS in the present specification. The DAS-RS may be transmitted with a long period or may be transmitted by the base station in a state of being included in a specific frequency domain. The DAS-RS may include a pattern or sequence which may vary according to antenna node.

Step of preparing for node assignment and step of assigning the node will be described with reference to steps S320 to S340 of FIG. 3.

As described above, the terminal receives a specific signal transmitted by the base station per antenna node, selects a preferred antenna node based on path loss measured with respect to each node, and reports the preferred antenna node to the base station, thereby being assigned an antenna node by the base station.

At this time, if antenna node assignment is frequently performed, resource overhead is increased due to repetition of the above-described procedures. In addition, if antenna node assignment varies according to frequency band, overhead may be further increased.

For example, assume that an assigned antenna node is adjacent to a terminal and a preferred antenna node has predetermined path loss or less. In this case, it is not necessary to vary antenna node assignment according to frequency band or to frequently perform antenna node assignment, because average path loss is barely changed according to frequency band and there is very little likelihood that the adjacent antenna node is changed per scheduling period (e.g., 1 ms) unless the speed of the terminal is very fast or antenna nodes are densely mounted.

Accordingly, the base station does not dynamically assign the antenna node to the terminal but preferably assigns the antenna node to the terminal in a semi-static fashion. That is, antenna node assignment is preferably performed in resource units remarkably greater than basic resource units (e.g., subframe). For example, antenna node assignment may be performed with respect to the entire frequency domain with a plurality of frame periods. At this time, a duration when antenna node assignment is performed may vary according to the speed of the terminal and the density of antenna nodes in the multi-node system and thus assignment may be performed with a predetermined period or in an event-driven manner. From the viewpoint of communication standard, antenna node assignment information may not be included in control information through a physical layer but may be included in control information through a higher layer using the semi-static properties of the antenna node assignment information. For example, in LTE, antenna node assignment information may be defined as a radio resource control (RRC) message which is a layer 3 message. Alternatively, the node may be assigned in an event-driven manner and node assignment information may be provided through a physical layer message in order to immediately receive channel state information as feedback information. Examples of the physical layer message include downlink control information (DCI) transmitted through a PDCCH in LTE.

Thus, in the present invention, the base station may receive information about at least one node preferred by the terminal among the plurality of nodes from the terminal and transmit information for assigning the at least one node preferred by the terminal to the terminal in a semi-static fashion. At this time, information transmitted to the terminal may include pilot information necessary to transmit feedback information of at least one node preferred by the terminal to the base station.

For convenience of description, at least one node preferred by the terminal among the plurality of nodes is referred to as a first node and information transmitted to the terminal in order to assign the first node to the terminal is referred to as first information.

At this time, the first node may be determined based on path loss measured with respect to each of the plurality of nodes by the terminal. However, the present invention is not limited thereto and the first node may be selected by applying various criteria (e.g., an uplink sounding signal, etc.).

In the node assignment method according to the present invention, first information including information for assigning the first node to the terminal and pilot information necessary to transmit feedback information of the first node from the terminal to the base station is transmitted to the terminal.

By the information for assigning the first node, the terminal recognizes the pattern and sequence of pilot information for measuring a preferred frequency band, a channel quality indicator (CQI), a precoding matrix index (PMI), etc.

Thereafter, the terminal feeds channel information such as a preferred frequency band, a CQI and a PMI back to the base station using the recognized pilot information.

At this time, the pilot information included in the first information includes an RS for measurement of a CQI or a PMI.

According to one embodiment of the present invention, the feedback information transmitted from the terminal to the base station is for a combination of at least one of the nodes included in the first node.

That is, the feedback information may include some or all of the feedback information (e.g., CQI, PMI, etc.) of all subsets of the assigned antenna nodes. For example, feedback information of the case in which only some of the assigned antenna nodes participate in downlink data transmission may be transmitted.

At this time, the information to be fed back by the terminal may be predefined or specified through specific control information by the base station.

In addition, if the feedback information is for a PMI, the feedback information may include a per-node-PMI included in the first node.

In case of the per-node-PMI, when the antenna node is dynamically changed, the base station does not find a precoding matrix which will be applied to all antenna nodes but finds a precoding matrix to be applied to each node. Thus, scheduling is easy.

For understanding, a method of assigning an antenna node in a semi-static fashion and a feedback method of a combination of at least one node included in the first node will be described in detail with reference to FIG. 11.

Figure 11:
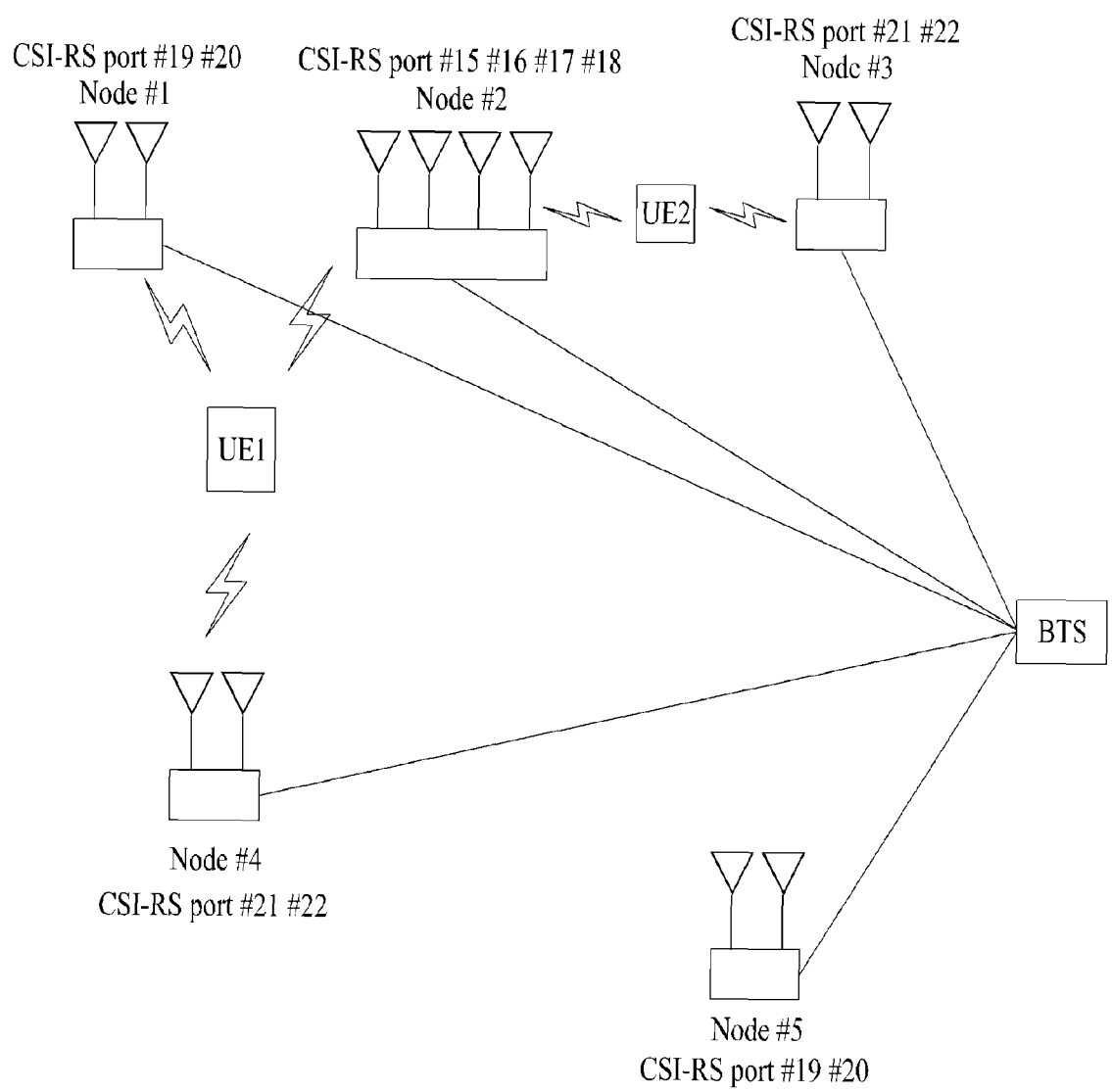
FIG. 11 is a diagram showing an example of assigning a node to a terminal in a semi-static fashion at a base station in a multi-node system according to an embodiment of the present invention.

FIG. 11 is a diagram showing an example of assigning a node to a terminal in a semi-static fashion at a base station in a multi-node system according to an embodiment of the present invention.

Although a description is made based on LTE-A for convenience in FIG. 11, the features of the present invention are applicable to other communication standards.

Assume that a total of 5 antenna nodes is present, 8 CSI-RS patterns which are RSs for measurement of a channel quality indicator are present, and a pilot pattern overlapping technique between antenna nodes is applied. That is, since a node 1 and a node 5 or a node 3 and a node 4 are physically distant from each other, the same CSI-RS pattern is applicable.

Referring to FIG. 11, the terminal (UE) selects a preferred antenna node by a signal transmitted by the base station per antenna node and reports the preferred antenna node selected for a long period (e.g., a plurality of frames) to the base station. The signal transmitted by the base station per antenna node may be different from the RS supported by LTE Rel.10 and thus is referred to as a DAS-RS in the present specification. The DAS-RS may be transmitted with a long period or may be transmitted by the base station in a state of being included in a specific frequency domain. The DAS-RS may include a pattern or sequence which may vary according to antenna node.

In FIG. 11, since a total of 5 antenna nodes are present, 5 DAS-RS patterns may be supported.

At this time, assume that each UE measures path loss from each node by the DAS-RS and a UE 1 selects nodes 1, 2 and 4 and a UE 2 selects nodes 2 and 3 as the preferred antenna nodes.

The base station informs the UE of pilot information (e.g., a CRS, a midamble, CSI-RS configuration information, etc.) which must be recognized by the terminal and a confirmation message of the preferred antenna node reported by the terminal as an example of a semi-static node assignment method.

Based on the pilot information, each UE may transmit feedback information to the base station. That is, as shown in FIG. 11, the UE 1 reads all CSI-RS ports 15 to 22 from antenna nodes 1, 2 and 4 and the UE 2 reads CSI-RS ports 15, 16, 17, 18, 21 and 22 from nodes 2 and 3.

Thereafter, each UE transmits feedback information of the antenna node assigned in the semi-static fashion to the base station. The transmission period of this feedback information may be different from a semi-static antenna node assignment period. For example, the feedback period may be equal to the feedback period of the CQI.

The UE 1 may feed CQI and/or PMI information back to the base station along with preferred frequency band information using all eight CSI-RS ports. The UE 2 may feed CQI and/or PMI information back to the base station along with preferred frequency band information using six CSI-RS ports.

At this time, if the conventional method is used, the PMI is obtained from 8tx. Codebook and CQI may be obtained when all eight antennas are used.

However, according to the features of the present invention, the UE may perform transmission in preparation for data transmission in a state of dynamically changing a combination of at least one of eight antenna nodes in a node-based manner. That is, the UE may feed all or some of the CQI and/or the PMI back to the base station when antenna nodes (1), (2), (4), (1, 2), (1, 4), (2, 4) and (1, 2, 4) are assigned.

If this is expressed by the CSI-RS port index, the CQI and/or PMI values when data is transmitted using the CSI-RS port combinations (19, 20), (21, 22), (15, 16, 17, 18), (19, 20, 21, 22), (15, 16, 17, 18, 19, 20), (15, 16, 17, 18, 21, 22), (15, 16, 17, 18, 19, 20, 21, 22) may be fed back to the base station.

At this time, on the assumption that data for other UEs is transmitted using the remaining CSI-RS ports to cause interference, the CQI and/or the PMI may be calculated.

As described above, if some combinations are fed back in order to reduce the amount of feedback information, objects to be combined may be defined by the standard. For example, feedback of an index for a combination having a maximum CQI according to the number of all possible antenna nodes, a CQI and a PMI may be defined by the standard.

Alternatively, the base station may transmit a specific control signal to the UE to transmit feedback information of a specific combination indicated by the specific control signal. For example, in LTE, a combination of nodes to which the channel state information will be fed using a DCI which is physical layer control information may be changed and set per subframe. That is, in the above example, at subframe #0, an indicator for a CSI-RS port combination (19, 20) is included in the DCI such that the UE feeds the channel state information of the CSI-RS port combination (19, 20) back through uplink resources indicated at subframe #0 and, at subframe #1, an indicator for a CSI-RS port combination (21, 22) is included in the DCI such that the UE feeds the channel state information of the CSI-RS port combination (21, 22) back through uplink resources indicated at subframe #1.

In case of the PMI, in order to simplify feedback and scheduling of the base station, instead of the PMI obtained from 8tx, a PMI combination for nodes 1, 2 and 4 may be fed back by a per-node-PMI.

That is, the UE finds the per-node-PMI per antenna node such that a channel from each node has optimal performance. In this case, a PMI is selected from 2tx. Codebook with respect to nodes 1 and 4 and a PMI is selected from 4tx. Codebook with respect to a node 2.

If the per-node-PMI is used, when the antenna node is dynamically changed, the base station does not find a precoding matrix which will be applied to all antenna nodes but finds a precoding matrix to be applied to each node. Thus, scheduling is easy.

Similarly, the UE 2 may feed three CQI values and two per-node-PMI values for antenna node combinations (2), (3) and (2, 3) back along with the preferred frequency band information using six CSI-RS port patterns used in assigned nodes 2 and 3 among 8tx. CSI-RS port patterns.

At this time, the CQI and PMI information is applicable to the whole or some of the frequency band.

Accordingly, the base station may assign the antenna node to the UE in the semi-static fashion, inform the UE of pilot information to be received by the UE, and receive the feedback information of various antenna node combinations from the UE using the specified feedback information.

Although the example of using different CSI-RS ports according to node is applied in the example of FIG. 11, different configurations may be applied according to node.

For example, in FIG. 10, node #1 may transmit ports #15 and #16 of CSI-RS configuration #1, node #2 may transmit ports #15 to #18 of CSI-RS configuration #2, node #3 may transmit ports #15 and #16 of CSI-RS configuration #3, node #4 may transmit ports #15 and #16 of CSI-RS configuration #4, and node #5 may transmit ports #15 and #16 of CSI-RS configuration #5. In this case, as the semi-static node assignment information, CSI-RS configurations #2 and #3 and the number of ports thereof may be provided to the UE 2. The UE 2 may feed CSI-RS configurations {#2} and {#3} and/or three CQI values and two per-node-PMI values for {#2, #3} sequentially or simultaneously.

When viewing antenna node assignment from the viewpoint of spatial resources assigned to the UE, not from the viewpoint of path loss, it is likely that resources assigned to the UE are differently assigned according to instantaneous frequency band.

For example, referring to FIG. 1, the UE 1 of FIG. 1 always uses antenna nodes 1, 2, 5 and 6 from the viewpoint of path loss and the UE 1 and the UE 2 must share the resources in a resource region in which the UE 2 is scheduled, due to presence of the UE 2.

Accordingly, the antenna nodes 1, 2, 5 and 6 perform downlink transmission for the UE 1 in a specific resource block (RB) assigned to the UE 1 but only the antennas 1, 2 and 5 may participate in downlink transmission for the UE 1 in another RB assigned to the UE 1 and the UE 2.

This is because the preferred sub-band of the terminal may or may not overlap per UE. Accordingly, data transmission using the assigned spatial resources is preferably performed through a dynamically changed antenna node.

Therefore, the present invention proposes a dynamic antenna node change data transmission method.

The dynamic antenna node change data transmission method means that a base station dynamically selects a subset of antenna nodes assigned to each UE in a semi-static fashion to perform data transmission in consideration of a resource assignment state.

That is, when the number of antenna nodes assigned to a predetermined terminal in a semi-static fashion is N, data is transmitted using only some of the N antenna nodes according to a resource block (RB) to which resources are assigned such that the number of antenna nodes for transmitting data and a combination thereof may be changed according to RB.

Information about the dynamic antenna node change data transmission may be explicitly transmitted with respect to scheduled resources and may be implicitly transmitted using a demodulation pilot such as a DM-RS or a precoded pilot.

For understanding, the above-described dynamic antenna node change data transmission method will be described in detail with reference to FIG. 11.

For convenience of description, the assumption of FIG. 11 is maintained.

The base station assigns resources to the UE using the feedback information received from the UE. Referring to FIG. 11, the UE 1 and the UE2 commonly prefer antenna node #2.

Accordingly, at antenna node #2, different time and frequency resources are assigned or the same time and frequency resources may be transmitted using a MU-MIMO scheme in order to support both UEs. According to such selection, antenna node assignment information may be dynamically changed.

Dynamic antenna node assignment information may be explicitly transmitted along with UE-specific resource assignment information through a PUCCH. For example, an indicator indicating at least one node for transmitting downlink information may be transmitted to the UE so as to explicitly indicate information. That is, which of antenna node combinations which may be set within the assigned resource region is indicated. In FIG. 11, in case of the UE 2, an indicator indicating whether only node 2 is used, whether only node 3 is used or whether both nodes 2 and 3 are used may be included.

In addition, dynamic antenna node assignment information may be implicitly transmitted.

The information may be implicitly transmitted when a DM-RS which is widely used in the current standard is used.

Since the UE 2 is assigned a total of 6 antennas, one to six streams may be simultaneously received using spatial multiplexing. For example, assume that the node 2 transmits one stream to the UE 1 and transmits one stream to the UE 2 using a MU-MIMO scheme in a specific frequency domain and the node 3 transmits one stream to the UE 2. At this time, a total of 3 DM-RSs are being transmitted to the UE 2 and the base station may provide information indicating that two of the three streams are a DM-RS pattern for the data streams transmitted to the UE 2. Using this information, the UE may remove one which is not assigned to the UE from the received 3 data streams and may receive the two streams. In this case, the UE may receive information using the total number of data streams transmitted by the node assigned to the UE and stream index information assigned to the UE without knowing which antenna node is dynamically assigned to the UE. At this time, the stream index information assigned to the UE may be transmitted from the base station to the terminal as control information.

Accordingly, since the base station can transmit data to the UE while dynamically changing an antenna node combination using some antenna nodes among antenna node sets assigned to the UE in the semi-static fashion in consideration of a resource assignment state, it is possible to flexibly adapt to environments.

Figure 12:
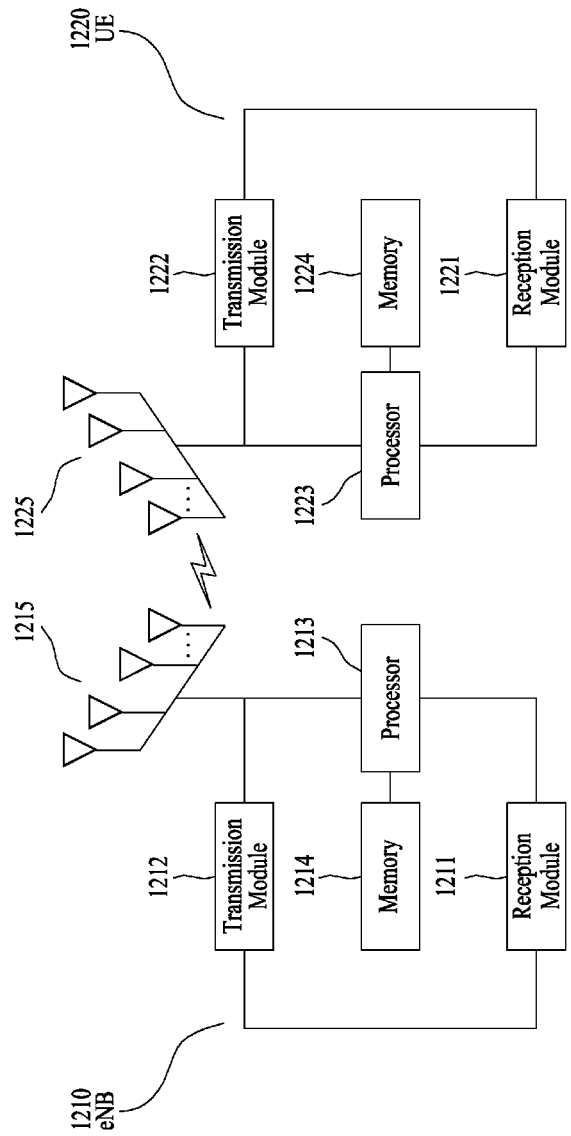
FIG. 12 is a block diagram showing the configuration of a communication device according to an embodiment of the present invention.

FIG. 12 is a block diagram showing the configuration of a base station 1210 and a UE 1220 according to an embodiment of the present invention.

Referring to FIG. 12, the base station 1210 according to the present invention includes a reception module 1211, a transmission module 1212, a processor 1213, a memory 1214 and a plurality of antennas 1215. The use of the plurality of antennas 1215 means that the base station supports MIMO transmission. The reception module 1211 may receive a variety of signals, data and information from the UE in uplink. The transmission module 1212 may transmit a variety of signals, data and information to the UE in downlink. The processor 1213 may control the overall operation of the base station 1210.

The base station 1210 according to the embodiment of the present invention may assign at least some of the plurality of nodes to the UE in a semi-static fashion in the multi-node system.

The processor 1213 of the base station 1210 controls reception of information indicating at least one first node preferred by the UE among the plurality of nodes from the UE through the reception module 1211 and transmission of first information for assigning the first node to the UE through the transmission module 1212. The first information includes pilot information necessary to transmit feedback information of the first node from the UE to the base station.

The processor 1213 of the base station 1210 receives the feedback information from the UE through the reception module 1211 and then controls transmission of downlink information to the UE based on the received feedback information. At this time, the downlink information is transmitted through at least one of the nodes included in the first node and at least one node, through which the downlink information is transmitted, may be dynamically selected by the processor 1213 in consideration of a resource assignment state.

The processor 1213 of the base station 1210 serves to process information received by the base station 1210 and information to be transmitted to an external device. The memory 1214 may store the processed information for a predetermined time and may be replaced by a component such as a buffer (not shown).

Referring to FIG. 12, the UE 1220 according to the present invention includes a reception module 1221, a transmission module 1222, a processor 1223, a memory 1224 and a plurality of antennas 1225. The use of the plurality of antennas 1225 means that the UE supports MIMO transmission. The reception module 1221 may receive a variety of signals, data and information from the base station in downlink. The transmission module 1222 may transmit a variety of signals, data and information to the base station in uplink. The processor 1223 may control the overall operation of the UE 1220.

The UE 1220 according to the embodiment of the present invention may be assigned at least some of the plurality of nodes in the semi-static fashion in the multi-node system including the plurality of nodes and the base station for controlling the plurality of nodes.

The processor 1223 of the UE 1220 controls transmission of information indicating at least one first node preferred by the UE among the plurality of nodes to the base station through the transmission module 1222, reception of first information for assigning the first node from the base station through the reception module 1221, and transmission of feedback information of the first node to the base station. The first information includes pilot information necessary to transmit the feedback information to the base station, and the feedback information include a combination of at least one of the nodes included in the first node.

The processor 1223 of the UE 1220 serves to process information received by the UE 1220 and information to be transmitted to an external device. The memory 1224 may store the processed information for a predetermined time and may be replaced by a component such as a buffer (not shown).

The detailed configuration of the base station or the UE may be implemented by applying the various embodiments of the present invention independently or simultaneously. A repeated description will be omitted for clarity.

In the description of FIG. 12, the description of the BS is equally applicable to an RN as a downlink transmitter and the description of the UE is equally applicable to an RN as a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of forms, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The present invention is applicable to a multi-node system and a wireless communication system. More specifically, the present invention is applicable to a wireless mobile communication device for a cellular system.

The invention claimed is:

1. A method of assigning at least some of a plurality of nodes to a terminal at a base station in a multi-node system including the plurality of nodes and the base station controlling the plurality of nodes, the method comprising:
   receiving, by the base station from the terminal, information indicating at least one first node preferred by the terminal among the plurality of nodes; and
   transmitting, by the base station to the terminal, first information for assigning the at least one first node to the terminal,
   wherein the first information includes pilot information necessary to transmit feedback information for the at least one first node to the base station,
   wherein the feedback information includes at least one of a channel quality indicator (CQI) and a precoding matrix index (PMI), and
   wherein the pilot information includes a reference signal (RS) for measuring the CQI or the PMI.

2. The method of claim 1, the method further comprising receiving, by the base station, the feedback information from the terminal,
   wherein the feedback information is for at least one node included in the at least one first node.

3. The method of claim 1, wherein:
   the plurality of nodes include a macro base station, a pico-cell base station (PeNB), a home base station (HeNB), a remote radio head (RRH), a relay, an antenna and a distributed antenna group, and
   each of the plurality of nodes is connected to the base station by wire.

4. The method of claim 1, wherein the at least one first node is determined based on path loss measured by the terminal from each of the plurality of nodes.

5. The method of claim 1, wherein the feedback information further includes a per-node-PMI for the at least one first node.

6. The method of claim 1, further comprising:
   receiving, by the base station, the feedback information from the terminal; and
   transmitting, by the base station, data to the terminal based on the received feedback information,
   wherein the data is transmitted through at least one node included in the at least one first node, and
   wherein the at least one node, through which the data is transmitted, is selected in consideration of a resource assignment state.

7. The method of claim 6, further comprising transmitting, by the base station, to the terminal, an indicator indicating the at least one node, through which the data is transmitted.

8. The method of claim 6, further comprising transmitting, by the base station, to the terminal, a total number of data streams transmitted to the terminal and index information of the data streams assigned to the terminal.

9. A method of allowing a terminal to be assigned at least some of a plurality of nodes by a base station in a multi-node system including the plurality of nodes and the base station controlling the plurality of nodes, the method comprising:
- transmitting, by the terminal to the base station, information indicating at least one first node preferred by the terminal among the plurality of nodes;
- receiving, by the terminal from the base station, first information for assigning the at least one first node; and
- transmitting, by the terminal to the base station, feedback information for the at least one first node,
- wherein the first information includes pilot information necessary to transmit the feedback information for the at least one first node to the base station,
- wherein the feedback information includes at least one of a channel quality indicator (CQI) and a precoding matrix in index (PMI), and
- wherein the pilot information includes a reference signal (RS) for measuring the CQI or the PMI.

10. The method of claim 9, wherein:
- the plurality of nodes include a macro base station, a pico-cell base station (PeNB), a home base station (HeNB), a remote radio head (RRH), a relay, an antenna and a distributed antenna group, and
- each of the plurality of nodes is connected to the base station by wire.

11. The method of claim 9, wherein the at least one first node is determined based on path loss measured by the terminal from each of the plurality of nodes.

12. The method of claim 9, wherein the feedback information further includes a per-node-PMI for the at least one first node.

13. A base station for assigning at least some of a plurality of nodes to a terminal in a multi-node system including the plurality of nodes and the base station controlling the plurality of nodes, the base station comprising:
- a reception module configured to receive information indicating at least one first node preferred by the terminal among the plurality of nodes from the terminal; and
- a transmission module configured to transmit, to the terminal, first information for assigning the at least one first node to the terminal,
- wherein the first information includes pilot information necessary to transmit feedback information for the at least one first node from the terminal to the base station,
- wherein the feedback information includes at least one of a channel quality indicator (CQI) and a precoding matrix index (PMI), and
- wherein the pilot information includes a reference signal (RS) for measuring the CQI or the PMI.

14. The base station of claim 13, wherein the feedback information further includes a per-node-PMI for the at least one first node.

15. The base station of claim 13, further comprising a processor configured to control reception of the feedback information from the terminal through the reception module and transmission of data to the terminal based on the received feedback information,
- wherein the data is transmitted through at least one node included in the at least one first node, and
- the at least one node, through which the data is transmitted, is selected in consideration of a resource assignment state.

16. A terminal assigned at least some of a plurality of nodes by a base station in a multi-node system including the plurality of nodes and the base station controlling the plurality of nodes, the terminal comprising:
- a transmission module configured to transmit information indicating at least one first node preferred by the terminal among the plurality of nodes to the base station;
- a reception module configured to receive first information for assigning the first node from the base station; and
- a processor configured to control transmission of feedback information for the at least one first node to the base station,
- wherein the first information includes pilot information necessary to transmit the feedback information for the at least one first node to the base station,
- wherein the feedback information includes at least one of a channel quality indicator (CQI) and a precoding matrix index (PMI), and
- wherein the pilot information includes a reference signal (RS) for measuring the CQI and PMI.

* * * * *